(12) United States Patent
Lin et al.

(10) Patent No.: US 12,638,330 B2
(45) Date of Patent: May 26, 2026

(54) MULTIPLE-WAVELENGTH REFLECTIVE RAMAN PROBE AND RAMAN SPECTRA DETECTION DEVICE

(71) Applicant: National Taiwan University of Science and Technology, Taipei City (TW)

(72) Inventors: Ding-Zheng Lin, Taipei City (TW); Kai-Jiun Tsai, New Taipei City (TW); Heng-Yi Chang, Kaohsiung City (TW); Yu-Ya Chung, Taoyuan City (TW)

(73) Assignee: National Taiwan University of Science and Technology, Taipei City (TW)

( * ) Notice: Subject to any disclaimer, the term of this patent is extended or adjusted under 35 U.S.C. 154(b) by 138 days.

(21) Appl. No.: 18/897,608

(22) Filed: Sep. 26, 2024

(65) Prior Publication Data

US 2025/0216262 A1 Jul. 3, 2025

(30) Foreign Application Priority Data

Dec. 29, 2023 (TW) ................................ 112151500

(51) Int. Cl.
*G01J 3/44* (2006.01)
*G01J 3/02* (2006.01)
(Continued)

(52) U.S. Cl.
CPC ........... *G01J 3/4412* (2013.01); *G01J 3/0208* (2013.01); *G01J 3/021* (2013.01); *G01J 3/26* (2013.01); *G01J 2003/1213* (2013.01)

(58) Field of Classification Search
CPC ........ G01J 3/4412; G01J 3/0208; G01J 3/021; G01J 3/26; G01J 2003/1213; G01J 3/0218;
(Continued)

(56) References Cited

U.S. PATENT DOCUMENTS

| | | | |
|---|---|---|---|
| 5,377,004 | A | 12/1994 | Owen et al. |
| 5,943,128 | A | 8/1999 | Slater |

(Continued)

FOREIGN PATENT DOCUMENTS

| | | |
|---|---|---|
| CN | 102565023 A | 7/2012 |
| CN | 203758916 U | 8/2014 |

(Continued)

*Primary Examiner* — Isiaka O Akanbi
(74) *Attorney, Agent, or Firm* — CKC & Partners Co., LLC

(57) ABSTRACT

A multiple-wavelength reflective Raman probe includes a first parabolic mirror, a second parabolic mirror, a third parabolic mirror, and a fourth parabolic mirror. The first parabolic mirror receives a laser light, and reflects as a collimated light beam. The second parabolic mirror receives the collimated light beam, and condenses to a convergent light beam. The third parabolic mirror has a through hole. The convergent light beam passes through the through hole, and is focused on the sample detecting position. The third parabolic mirror also collects the light reflected by the sample detecting position and reflects as a collimated detection light beam. The fourth parabolic mirror collects the detection light beam, and condenses to a detection output light beam. The detection output light beam is focused at a focal point of the fourth parabolic mirror to be collected by a spectrometer.

15 Claims, 4 Drawing Sheets

(51) Int. Cl.
*G01J 3/12* (2006.01)
*G01J 3/26* (2006.01)

(58) Field of Classification Search
CPC ........... G01J 3/44; G01N 21/65; G01N 21/01; G02B 5/08; G02B 5/20
USPC ................ 356/301, 447, 327, 445, 369, 497
See application file for complete search history.

(56) References Cited

U.S. PATENT DOCUMENTS 6,621,574 B1 9/2003 Forney et al.
6,885,445 B2 * 4/2005 Bennett ................. H01J 37/256 356/326
7,212,343 B1 * 5/2007 He ..................... G02B 6/29383 359/619
8,488,244 B1 * 7/2013 Li ........................ G02B 6/4215 398/79
10,209,195 B2 2/2019 Jian
10,253,346 B2 4/2019 Auner et al.
10,820,826 B2 11/2020 Ji et al.
11,333,597 B2 * 5/2022 Yan ........................ G01N 21/53
11,740,128 B2 8/2023 Katz
2005/0043597 A1 2/2005 Xie
2010/0014076 A1 * 1/2010 Henneberg ................ G01J 3/08 356/301
2014/0219606 A1 * 8/2014 Sorin ................. G02B 6/02214 385/27
2016/0146722 A1 * 5/2016 Koerner ................. G01N 21/65 356/497
2018/0209909 A1 7/2018 Jian
2018/0266962 A1 9/2018 Day
2022/0155237 A1 * 5/2022 Konishi .................... G01J 3/18
2023/0251190 A1 8/2023 Prater

FOREIGN PATENT DOCUMENTS

CN 107167465 A 9/2017
CN 208588682 U 3/2019
CN 110455804 A 11/2019
CN 110772224 A 2/2020
CN 213275352 U 5/2021
CN 218974176 U 5/2023
KR 101859717 B1 6/2018
WO 2012057875 A1 5/2012

* cited by examiner

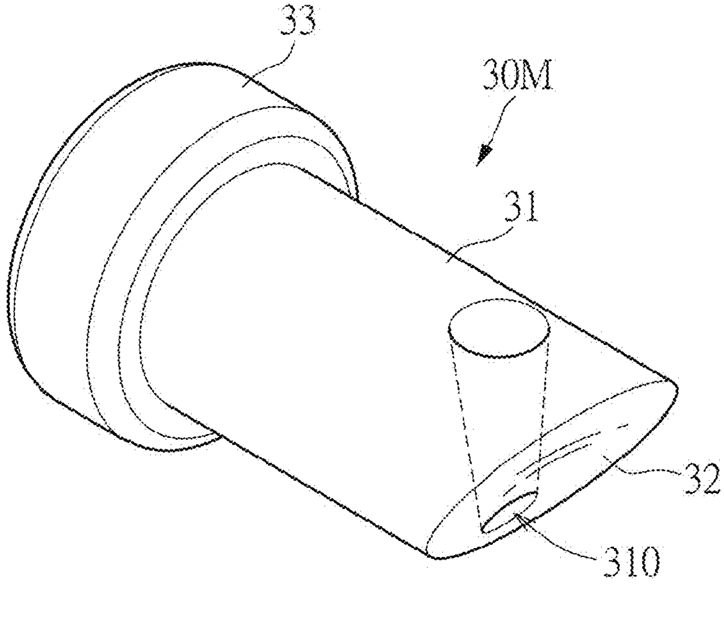
Fig. 2
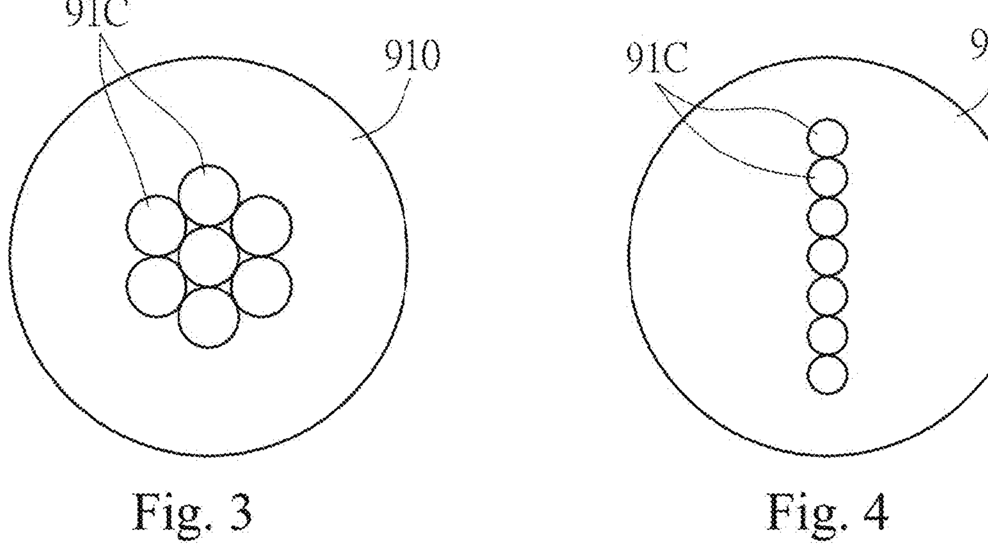
Fig. 3
Fig. 4

MULTIPLE-WAVELENGTH REFLECTIVE RAMAN PROBE AND RAMAN SPECTRA DETECTION DEVICE

RELATED APPLICATIONS

This application claims priority to Taiwan Application Serial Number 112151500, filed Dec. 29, 2023, which is herein incorporated by reference.

BACKGROUND

Field of Invention

The present disclosure relates to a multiple-wavelength reflective Raman probe and a Raman spectra detection device, especially relates to a reflective Raman probe that can form a Raman spectra detection device with the cooperation of a laser source and a spectrometer. The reflective Raman probe is used to receive the laser source and excite the sample for a larger focused spot through reflection. Then, the Raman spectra are collected by reflective optical elements and sent to the spectrometer.

Description of Related Art

Traditional microscopic Raman systems use a single objective lens to condense and receive light. Its optical design is such that if one were to enlarge the focus light point of the laser, it often comes with the usage of a low magnification objective lens. However, the numerical aperture of the low magnification objective lens is small, which affects the collection efficiency of Raman scattering light. In contrast, when using a high magnification objective lens, the focusing spot of the laser would become smaller, which causes damage to the sample due to high energy density. Especially for those samples that have an upper limit for damage thresholds, such as antiques, energetic material, or plastic Surface Enhanced Raman Scattering (SERS) substrate, which tends to cause the samples or SERS substrates irreversible damage or heating during measurements. Finally, it results in the intensity decline or wavenumber shift of the Raman spectra, which affects the result of the analytical evaluation.

SUMMARY

The technical problems that the present disclosure is to improve efficiency and provide a multiple-wavelength excitation ability of Raman probe and a Raman spectra detection device according to the insufficient of prior art.

To improve the technical problem described above, one technical aspect of the present disclosure is, providing a multiple-wavelength reflective Raman probe for receiving a laser beam, which includes a first parabolic mirror, a second parabolic mirror, a third parabolic mirror, and a fourth parabolic mirror. The first parabolic mirror has a first mirror surface. The first mirror surface is arranged to focus at a first focal length. The first parabolic mirror receives the laser beam and reflects the laser beam into a collimated light beam. The second parabolic mirror has a second mirror surface. The second mirror surface is arranged to focus at a second focal length. The second mirror surface faces toward the first mirror surface to receive the collimated light beam. The second mirror surface condenses the collimated light beam and reflects out a convergent light beam to the sample surface. The convergent light beam is focused at a focal point of the second focal length. The third parabolic mirror has a third mirror surface. The third mirror surface is arranged to focus at a third focal length. The third mirror surface faces away from the second mirror surface. There is a through hole on the third parabolic mirror. The convergent light beam passes through the through hole. The second focal length exceeds the third parabolic mirror surface and is focused on the sample detecting position. The third parabolic mirror is located between the sample detecting position and the second parabolic mirror. The third parabolic mirror surface collects a Raman scattering light reflected by the sample detecting position and reflects as a collimated detection light beam. The collimated light beam passes through a long pass filter to remove the excitation laser beam and hit on the fourth parabolic mirror. The fourth parabolic mirror has a fourth mirror surface. The fourth mirror surface is arranged to focus at a fourth focal length. The fourth mirror surface collects the Raman scattering light and condenses to an output light beam. The output light beam is focused at a focal point of the fourth focal length to the collection fiber or spectrometer.

To improve the technical problem described above, one technical aspect of the present disclosure is providing a Raman spectra system, which includes a laser source, a multiple-wavelength reflective Raman probe, and a spectrometer. The laser source provides the laser light beam. The laser light beam can be configured to have different wavelengths. The multiple-wavelength reflective Raman probe includes a first parabolic mirror, a second parabolic mirror, a third parabolic mirror, and a fourth parabolic mirror. The first parabolic mirror has a first mirror surface. The first mirror surface is arranged to focus at a first focal length. The first parabolic mirror receives the laser light beam and reflects the laser light beam into a collimated light beam. The second parabolic mirror has a second mirror surface. The second mirror surface is arranged to focus at a second focal length. The second mirror surface faces toward the first mirror surface to receive the collimated light beam. The second mirror surface condenses the collimated light beam and reflects out a convergent light beam. The convergent light beam is focused at a focal point of the second focal length. The third parabolic mirror has a third mirror surface. The third mirror surface is arranged to focus at a third focal length. The third mirror surface faces away from the second mirror surface. There is a through hole on the third parabolic mirror. The convergent light beam passes through the through hole. The second focal length exceeds the third mirror surface and is focused on the sample detecting position. The third parabolic mirror is located between the sample detecting position and the second parabolic mirror. The third mirror surface collects a Raman scattering light reflected by the sample detecting position and reflects as a collimated detection light beam. The collimated light beam passes through a long pass filter to remove the excitation laser beam and hit on the fourth parabolic mirror. The fourth parabolic mirror has a fourth mirror surface. The fourth mirror surface is arranged to focus at a fourth focal length. The fourth mirror surface collects the Raman scattering light and condenses it to an output light beam. The output light beam is focused at a focal point of the fourth focal length to the collection fiber or spectrometer. The spectrometer receives the output light beam for spectra analysis.

One of the advantages of the present disclosure is that the multiple-wavelength reflective Raman probe that the present disclosure provided uses four parabolic mirrors, which can effectively spread the energy at the sample detecting position while straddling the efficiency of receiving light. Since reflective optical elements are used, there won't be a shift in the size of the focused spot or focal plane for the different exciting wavelengths. Thereby adjusting the size of the focusing spot, improving the light collection efficiency, effectively enlarging the focusing spot, and therefore lowering the focusing spot's energy density. The reflective parabolic mirror can solve the problem of the shift of the focal plane of different wavelengths caused by the chromatic aberration of traditional transmission-type lenses.

In order to further understand the characteristics and technical contents of the present disclosure, the following detailed descriptions and drawings related to the present disclosure are provided. However, drawings are provided for the purpose of illustration and explanation, and are not intended to limit the present disclosure.

BRIEF DESCRIPTION OF THE DRAWINGS

FIG. 2 is a stereogram of the third parabolic mirror with a through hole of the present disclosure.

FIG. 3 is a schematic view of the configuration of the optical fiber bundle of the external connecting optical fiber portion of the output optical fiber of the spectrometer of the present disclosure.

FIG. 4 is a schematic view of the configuration of the optical fiber bundle of the internal connecting optical fiber portion of the output optical fiber of the spectrometer of the present disclosure.

DETAILED DESCRIPTION

"LIGHT EMITTING DEVICE" of the present disclosure is described as follows. Those skilled in the art can understand the advantages and effects of the present disclosure from the contents disclosed in the specification. The present disclosure can be implemented or applied in various other specific embodiments, and various modifications and changes can be made without departing from the spirit and scope of the present disclosure. In addition, the drawings of the present disclosure are merely illustrative and are not intended to be in the actual size. The following embodiments will further explain the related technical contents of the present disclosure but are not intended to limit the scope of the present disclosure.

It should be understood that, although the terms "first", "second", "third", and the like may be used herein to describe various elements or signals, however, these elements or signals are not limited by these terms. These terms are primarily used to distinguish one element from another or one signal from another. In addition, the term "or" as used herein may include a combination of any one or more of the associated listed items, depending on the actual situation.

Figure 1:
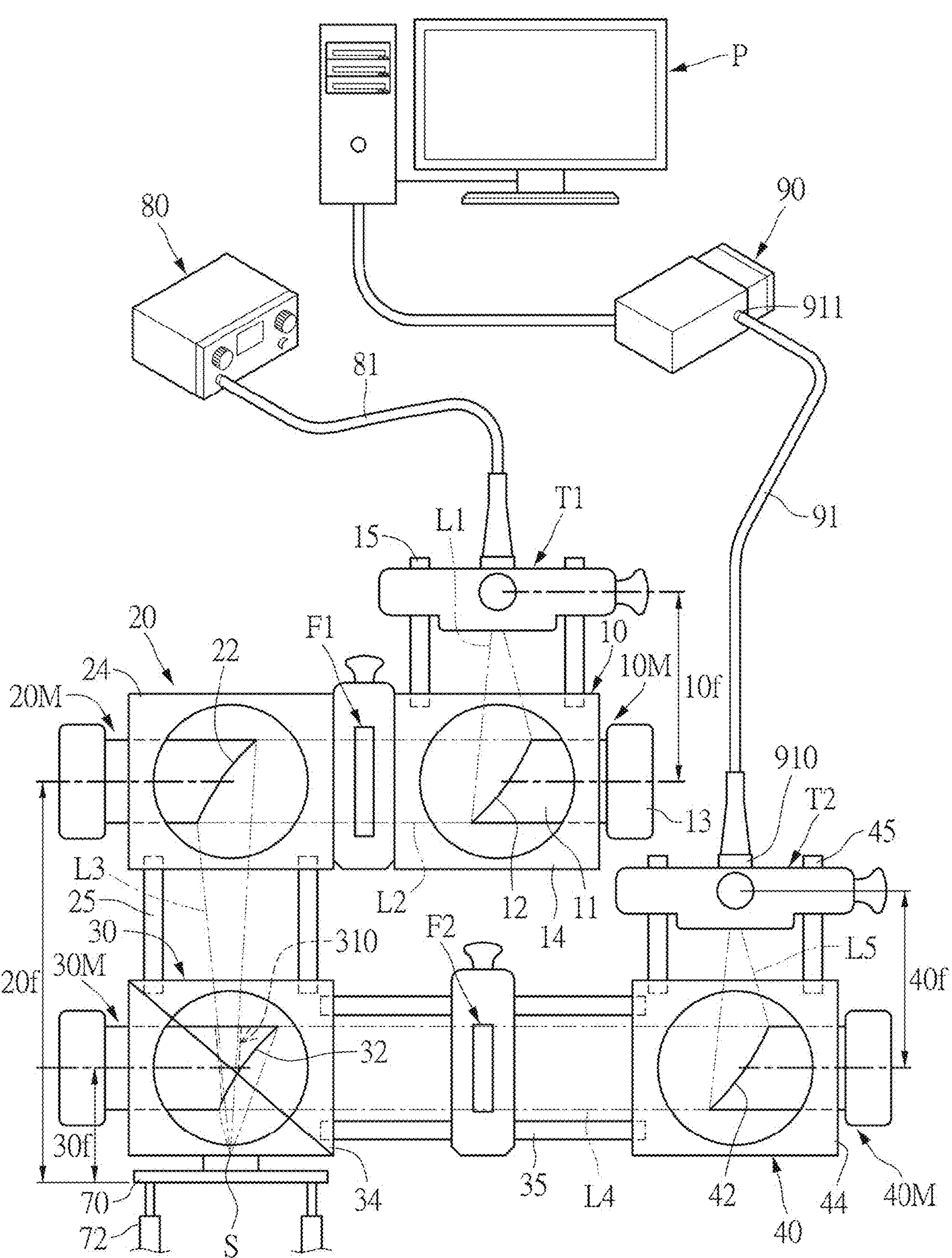
FIG. 1 is a schematic view of a Raman spectra detection device having the multiple-wavelength reflective Raman probe of the present disclosure.

Refer to FIG. 1, which shows a schematic view of a Raman spectra detection device of the present embodiment. The Raman spectra detection device includes a laser source 80, a multiple-wavelength reflective Raman probe, and a spectrometer 90. The multiple-wavelength reflective Raman probe, or multiple-wavelength reflective Raman probe to be short, is an optical apparatus suitable for Raman spectrometer, which is used combined with laser source 80 (such as, semiconductor laser) and spectrometer 90. The spectrometer 90 can present the Raman spectra of the sample through the calculation of a computer P.

The reflective Raman probe of the present embodiment includes a light beam receiver T1, a first parabolic mirror 10M, a second parabolic mirror 20M, a third parabolic mirror 30M, a fourth parabolic mirror 40M and a light beam outputter T2.

The light beam receiver T1, in particular, is a base body used to fix the input optical fiber in the present embodiment. The light beam receiver T1 receives the laser light beam of the laser source 80.

The first parabolic mirror 10M has a first mirror surface 12. The first mirror surface 12 is a concaved parabolic mirror surface. In the present embodiment, the first parabolic mirror 10M is an Off-Axis Parabolic (OAP) Mirror, or off-axis mirror for short, which includes a cylindrical mirror body 11 and a disc-shaped base 13. The first mirror surface 12 is formed at the end of the cylindrical mirror body 11. The reflective mirror surface of the off axis parabolic mirror is a part of the parabolic surface, the difference between the off axis parabolic mirror and the standard parabolic mirror is that the focal point of the off axis parabolic mirror is located out of the optical axis. The off axis parabolic mirror can focus the parallel incident collimated light beams at the focal point, and can also transfer the light from the point light source into parallel light beams according to the geometry principle of the paraboloid. The advantage of using an off-axis parabolic mirror in the present embodiment is that it won't produce spherical aberration and chromatic aberration, and it can also eliminate the phase delay and absorption loss introduced by transmission-type optical elements.

The first mirror surface 12 is arranged to focus at a first focal length 10*f*. The first parabolic mirror 10M receives the laser light beam L1, and reflects the laser light beam L1 into a collimated light beam L2. As an example, the first focal length of the present embodiment is 25.4 millimeters, which is 1 inch. The focal length of the present embodiment is the reflective focal length.

As shown in FIG. 1, the laser light beam L1 goes from up to down, perpendicular to the optical axis. The collimated light beam L2 is parallel to the optical axis, the included angle between the collimated light beam L2 and the laser light beam L1 is 90 degree. In other words, the off-axis angle of the off axis parabolic mirror of the present embodiment is 90 degree. However, the disclosure is not limited to this, the off-axis angle of the off axis parabolic mirror can also be configured to other angle.

The present embodiment additionally provides a first fixing cage 14 to fix the first parabolic mirror 10M, in which the first parabolic mirror 10M, the first fixing cage 14, and other fixing components can be collectively called the first reflective device 10. The first fixing cage 14 can be cube-shaped with circular holes formed on each side penetrating through and connecting each other. The fixing cage of the present embodiment can be convenient for assembling and adjusting, and can also add connecting bars on each side to connect to other fixing cages or devices.

In particular, the light receiver T1 of the present embodiment is fixed to the first fixing cage 14 through a first fixing bar 15. The light receiver T1 is located at the focal point of the first focal length to fix the laser source 80. The laser light beam L1 passes through the light receiver T1 and goes toward the first parabolic mirror 10M. However, the present disclosure is not limited to such a method of fixing. The multiple parabolic mirrors can be mounted in an integrated housing or on the same frame.

The second parabolic mirror 20M has a second mirror surface 22. The second parabolic mirror 20M is also an off axis parabolic mirror in the present embodiment. The second mirror surface 22 is arranged to focus at a second focal length 20*f*. The second mirror surface 22 faces toward the first mirror surface 12 to receive the collimated light beam L2. The second mirror surface 22 condenses the collimated light beam L2 and reflects out a convergent light beam L3. The convergent light beam L3 is focused at a focal point of the second focal length 20*f*. The convergent light beam L3 is perpendicular to the optical axis of the second parabolic mirror 20M. As an example, the second focal length of the present embodiment is 50.8 millimeters, which is 2 inches.

Similarly, the present embodiment additionally provides a second fixing cage 24 to fix the second parabolic mirror 20M, in which the second parabolic mirror 20M, the second fixing cage 24, and other fixing components can be collectively called the second reflective device 20. The structure of the second fixing cage 24 is similar to the first fixing cage 14. The second fixing cage 24 can connect to the first fixing cage 14 through connecting bars. However, the present disclosure is not limited to such a method of fixing. The multiple parabolic mirrors can be mounted in an integrated housing or on the same frame.

As an additional remark, the multiple-wavelength reflective Raman probe also includes a first optical filter F1. The first optical filter F1 is arranged between the first parabolic mirror and the second parabolic mirror, which can be used to filter out the Raman spectra from the input optical fiber 81 of the laser source 80, and also used to suppress the ambient light. The first optical filter F1 can be, for example, a laser line filter or band pass filter.

The third parabolic mirror 30M has a third mirror surface 32. The third parabolic mirror 30M is also an off axis parabolic mirror. The third mirror surface 32 is arranged to focus at a third focal length 30*f*. The third mirror surface 32 faces away the second mirror surface 22. The second focal length 20*f* exceeds the third mirror surface 32. As an example, the third focal length 30*f* in the present embodiment is 25.4 millimeters, which is 1 inch.

Similarly, the present embodiment additionally provides a third fixing cage 34 to fix the third parabolic mirror 30M, in which the third parabolic mirror 30M, the third fixing cage 34, and other fixing components can be collectively called the third reflective device 30. The structure of the third fixing cage 34 is similar to the first fixing cage 14. The third fixing cage 34 can connect the second fixing cage 24 through multiple second connecting bars 25. However, the present disclosure is not limited to such a method of fixing. The multiple parabolic mirrors can be mounted in an integrated housing or on the same frame.

Please refer to FIG. 2 and FIG. 1, similar to the first parabolic mirror 10M, the third parabolic mirror 30M has a cylindrical mirror body 31 and a disc-shaped base 33. One of the characteristics of the present embodiment is that, the cylindrical mirror body 31 of the third parabolic mirror 30M has a through hole 310. The through hole 310 penetrates the third mirror surface 32 and a circular surface of the cylindrical mirror body 31. The shape of the through hole 310 is roughly a cone. The diameter of the through hole of the present embodiment is 3 millimeter to 7 millimeter. The through hole 310 of the present embodiment is perpendicular to the optical axis of the third parabolic mirror 30M and aligns to the focal point of the light beam that is focused outside the third parabolic mirror 30M.

As shown in FIG. 1, the convergent light beam L3 reflected by the second parabolic mirror 20M passes through a through hole 310 and focuses at a sample detecting position S. In other words, the sample detecting position S is disposed at the focal point of the third focal length 30*f*. The sample detecting position S is the position to place the sample to be tested in the present embodiment. The through hole 310 allows the convergent light beam L3 to hit the sample.

In the present embodiment, the sample detecting position S abuts the bottom of the third fixing cage 34. The advantage is that the convergent light beam L3 won't exceed the bottom of the third fixing cage 34. The third parabolic mirror 30M is disposed between the sample detecting position S and the second parabolic mirror 20M. Since the sample detecting position S is located at the focal point of the third focal length 30*f* of the third parabolic mirror 30M, the scattering light produced by the sample detecting position S can be reflected by the third mirror surface 32 into a collimated detection light beam L4. The collimated detection light beam L4 goes toward the fourth parabolic mirror 40M.

As an example, the third parabolic mirror 30M can use a single-point diamond turning machine to process aluminum substrate to lower the surface roughness, which reduces scattering to the greatest extent. The third mirror surface 32 of the third parabolic mirror 30M is preferred to be coated with protective gold film, protective silver film, protective aluminum film or UV-enhancing aluminum film to increase reflectivity.

As an additional remark, the sample detecting position S can be disposed on a sample stage 70. The sample stage 70 can have an access device 72. The access device 72 can take out the sample stage 70, leaving the third fixing cage 34. After placing the sample to be tested, the access device then moves the sample stage to the focal point of the third focal length 30*f* of the third parabolic mirror 30M.

The fourth parabolic mirror 40M has a fourth mirror surface 42. The fourth mirror surface 42 is arranged to focus at a fourth focal length 40*f*. The fourth parabolic mirror 40M is also an off axis parabolic mirror. The fourth parabolic mirror 40M receives the collimated detection light beam L4, reflected by the fourth mirror surface 42, and condenses to an output light beam L5. The output light beam L5 of the present embodiment is focused at a focal point of the fourth focal length 40*f*. As an example, the fourth focal length in the present embodiment is 101.8 millimeters.

Similarly, the present embodiment additionally provides a fourth fixing cage 44 to fix the fourth parabolic mirror 40M, in which the fourth parabolic mirror 40M, the fourth fixing cage 44, and other fixing components can be collectively called the fourth reflective device 40. The structure of the fourth fixing cage 44 is similar to the first fixing cage 14. The fourth fixing cage 44 can connect the third fixing cage 34 through multiple third connecting bars 35. However, the present disclosure is not limited to such a method of fixing. The multiple parabolic mirrors can be mounted in an integrated housing or on the same frame.

As an additional remark, the present embodiment also includes a second optical filter F2. The second optical filter F2 is located between the third parabolic mirror 30M and the fourth parabolic mirror 40M, and is used to intercept a light in specific wavelength. The second optical filter F2 can be, as an example, a notch filter or long pass filter.

The multiple-wavelength reflective Raman probe also includes a light beam outputter T2, which is disposed at the focal point of the fourth focal length 40*f*. The fixing method of the light beam outputter T2 can be, for example, fixing through a fourth fixing bar 45 to the fourth reflection device 40. The light beam outputter T2 is used to connect to the spectrometer 90. It is worth mentioning that, the output light beam L5 in the present embodiment is circular-shaped. The output optical fiber 91 can select a round-to-linear fiber to optimize the output efficiency. Please also refer to FIG. 3 and FIG. 4, in particular, the output optical fiber 91 has an external connecting optical fiber portion 910 and an internal connecting optical fiber portion 911. The external connecting optical fiber portion 910 is connected to the light beam outputter T2. The internal connecting optical fiber portion 911 is connected to the spectrometer 90. The optical fiber bundle in the external connecting optical fiber portion 910 of the output optical fiber 91 is circular configuration (circle). The optical fiber bundle in the internal connecting optical fiber portion 911 of the output optical fiber 91 of the spectrometer 90 is linear configuration (straight) to be convenient to connect to the entrance slit of the spectrometer to increase the light collection efficiency.

As an example, there are seven optical fiber bundles 91C to create a fiber bundle of output optical fiber 91. The arrangement of the seven optical fiber bundles 91C at the external connecting optical fiber portion 910 is a circular configuration (circle). The arrangement of the seven optical fiber bundles 91C at the internal connecting optical fiber portion 911 is a linear configuration (straight). The round-to-linear fiber can be used to increase the coupling efficiency between the spectrometer 90 and the light beam outputter T2, since linear configuration better fits the shape of the entrance slit of the spectrometer 90 than single bundle or circular configuration, thus increasing the amount of light that enters the spectrometer 90.

As an additional remark, the light path of the reflective Raman probe of the present embodiment is designed, such that the parabolic mirrors can separately adjust the size of the focal point and the range of the angle of light receiving. In particular, the first parabolic mirror 10M can be an optical element with a smaller numerical aperture (NA), such as NA=0.035, which can disperse the excited energy by the larger focused spot. Moreover, in receiving light, the third parabolic mirror 30M can have a bigger numerical aperture (NA larger than 0.35), which can more effectively collect the nondirective Raman scattering light. Last, the fourth parabolic mirror 40M is designed to match the light collection angle of the spectrometer 90, such as NA less than 0.22. In other words, the numerical aperture of the third parabolic mirror 30M is greater than the numerical aperture of the fourth parabolic mirror 40M. The numerical aperture of the fourth parabolic mirror 40M is typically greater than the numerical aperture of the first parabolic mirror 10M. Thereafter, it combined with the round-to-linear optical fiber to receive light. Thereby, the light path design of the reflective Raman probe of the present embodiment can cast off the limitation of sharing the common light path of light entering and light receiving of the traditional portable Raman optical probe. The reflective Raman probe of the present embodiment can disperse the energy on the test sample while maintaining the total input energy and large light collection efficiency, which can prevent the test sample from damage, thereby improving the robustness and reproducibility of the spectra.

[Experiment Comparison Result]

Experiment comparison I: the comparison with commercial dual-wavelength Raman probe (InPhotonics Inc.), see Patent Document U.S. Pat. No. 6,621,574, WO2012057875A1 is below. Inside the commercial dual-wavelength Raman probe there are non-polarizing beamsplitter (NPBS) and dichroic beam splitter, which makes the efficiency of the incident light loss at least half of it. The dual-wavelength reflective Raman probe of the present embodiment improves the way of the traveling of the light path. The efficiency of the light entering can increase from 25% to 75% in a real test. In other words, the present embodiment can increase the efficiency of the light entering by three times.

Figure 5:
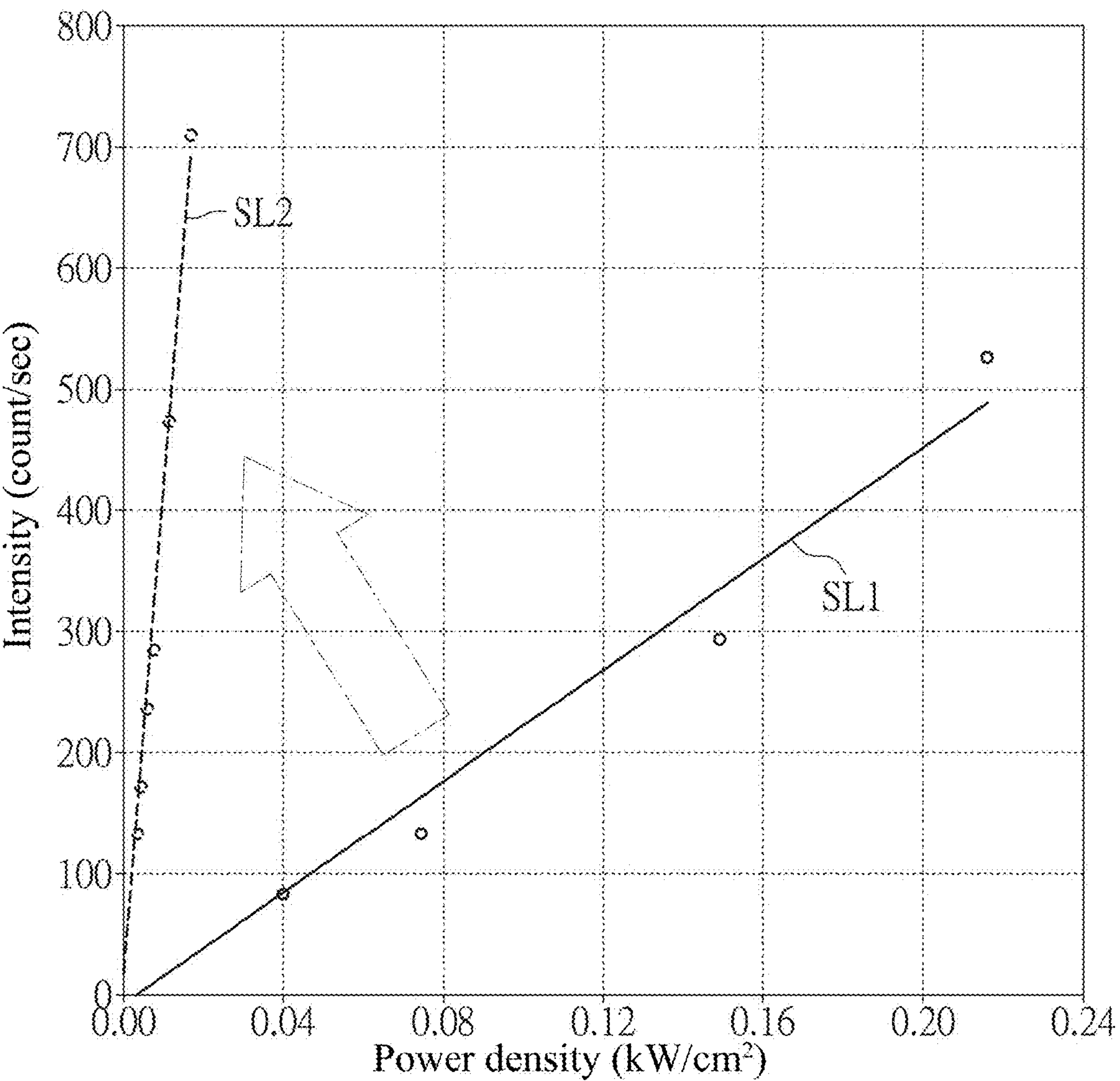
FIG. 5 is a statistical line chart of the light collection efficiency of the probe to the power density of the focusing spot of the present disclosure.

Refer to FIG. 5, the statistical line SL1 is the commercial dual-wavelength Raman probe. The statistical line SL2 is the embodiment of the dual-wavelength reflective Raman probe. The light receiving efficiency of the dual-wavelength reflective Raman probe of the present embodiment can increase eight times compared to the commercial dual-wavelength Raman probe under the same energy density excitation condition.

Figure 6:
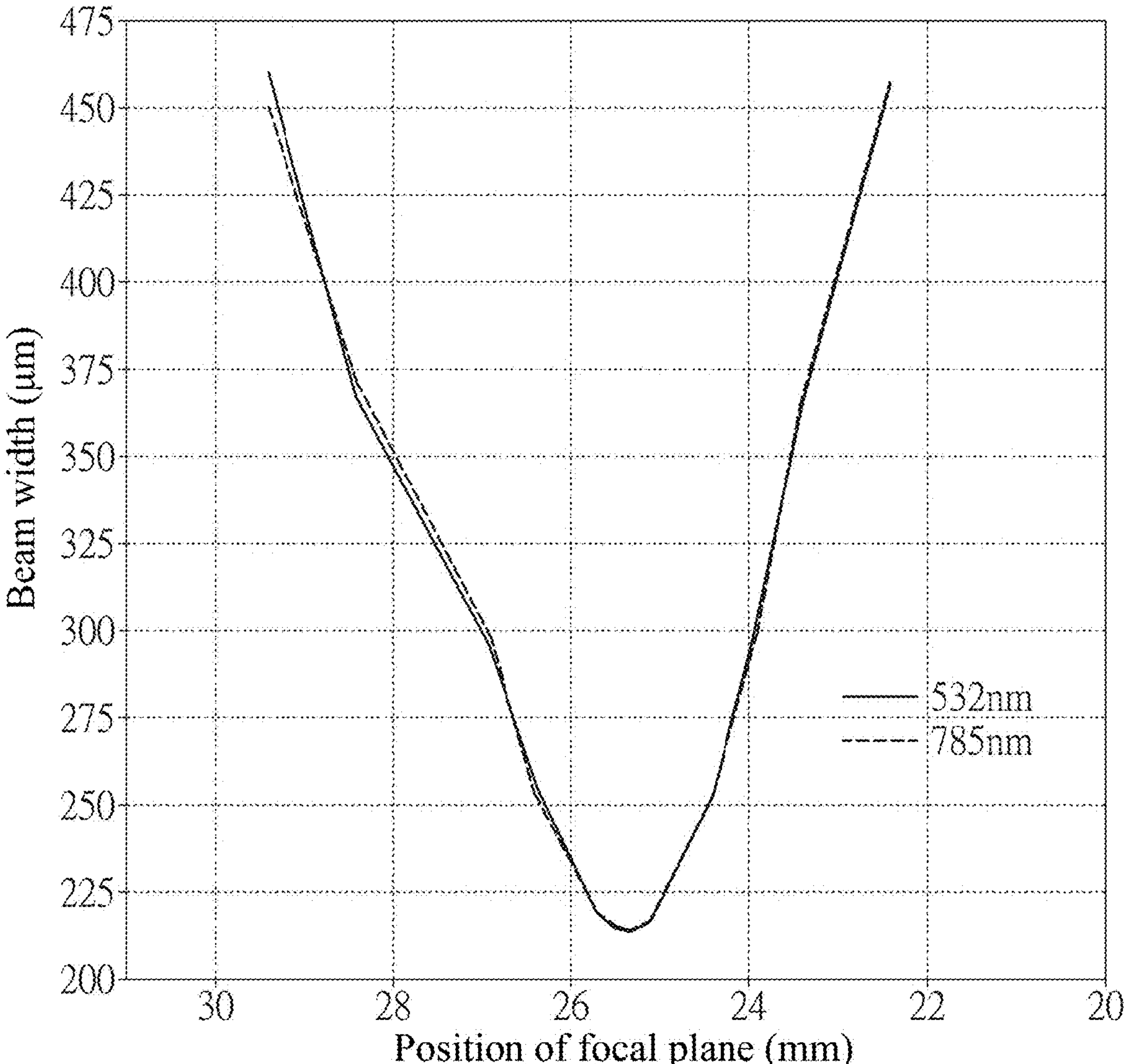
FIG. 6 is a graph of the position of the focal plane and the beam width of the two excitation wavelengths of the present disclosure.

Experiment comparison II: since the commercial dual-wavelength Raman probe uses multiple convex lens, there is a difference (30 μm) between the size of the focal light point of two wavelengths (532 nm/785 nm), and a deviation of the position of the focal planes. The present embodiment uses multiple parabolic mirrors. The advantage is that there is no spherical aberration and chromatic aberration, and it can also eliminate the phase delay and absorption loss induced by transmission-type optical elements, and thereby solves the problems mentioned above. Refer to FIG. 6, The position of the focal plane and the width of the light beam (diameter of the focused spot) at two wavelengths (532 nm/785 nm) of the dual-wavelength reflective Raman probe of the present embodiment is consistent.

[The Advantages of the Embodiment]

One of the advantages of the present disclosure is that the multiple-wavelength reflective Raman probe that the present disclosure provided uses four parabolic mirrors, which can effectively disperse the energy on the detecting position of the sample while taking into account the light collection efficiency at the same time. Since reflective optical elements are used, there won't be any shift in the diameter and position for different excitation wavelengths of the focused spot. Thereby adjusting the size of the focused spot, which means effectively lowering the energy density of the focused spot. Moreover, improving the light collection efficiency by the third parabolic mirror with a high numerical aperture and a round-to-linear fiber bundle to match the entrance slit and collection cone angle of the spectrometer. The reflective parabolic mirror can solve the problem of the shift of focal plane of different wavelengths caused by the chromatic aberration of traditional lenses.

To be more specific, the reflective Raman probe of this invention has the characteristics of low energy density and better excitation and collection efficiency. The particular advantages are listed below:

I: The improved light entering efficiency: the reflective Raman probe of the present embodiment uses the common light path design of the through hole for multiple excitation wavelengths between the third parabolic mirror and the sample, such that there is no need for beamsplitter, which reduces the number of optical elements to provide better efficiency of light entering.

II: The improved light collection efficiency: the collection efficiency of the reflective Raman probe of the present embodiment can improve by eight times compared to the commercial Raman probe under the same excitation energy density condition. In other words, the reflective Raman probe of the present embodiment can reduce the damage caused by the photothermal effect for the low damage threshold test sample, such as polymer SERS substrate, and thus provide better signal intensity.

III: No chromatic aberration: the way of traveling of the light beam of the reflective Raman probe of the present embodiment is completely by reflection. Under the condition of multiple excitation wavelengths, the positions of the focal plane and the focusing beam width are consistent. There is no need to refocus again when switching excitation wavelengths, which improves the convenience of operation.

IV: Low energy density focused spot: the diameter of the focusing spot of the reflective Raman probe of the present embodiment can reach >185 μm in the real experiment, compared to the diameter D=70~100 μm of the focusing spot of the commercial Raman probe, or the diameter D<10 μm of the focusing spot of the micro Raman system. Obviously, the energy density can be decreased by one to two orders, which is less likely to damage the test samples, and less likely to cause the shift of the Raman spectra of the test sample, which affects the result of qualitative analysis.

The above disclosure is only a preferred embodiment of the present disclosure, and is not intended to limit the scope of the present disclosure. For example, the reflective Raman Probe can be used to detect the fluorescence signal by choosing adequate optical filters. Therefore, any equivalent technical changes made by using the present specification and the contents of the drawings are included in the scope of the present disclosure.

What is claimed is:

1. A multiple-wavelength reflective Raman probe for receiving a laser beam and outputting Raman scattering spectrum signal, comprising:

a first parabolic mirror having a first mirror surface, wherein the first mirror surface is arranged to focus at a first focal length, the first parabolic mirror receives the laser beam, the laser beam is reflected into a collimated light beam by the first mirror surface;

a second parabolic mirror having a second mirror surface, wherein the second mirror surface is arranged to focus at a second focal length, the second mirror surface faces toward the first mirror surface to receive the collimated light beam, the second mirror surface condenses the collimated light beam and reflects out a convergent light beam, the convergent light beam is focused at a focal point of the second focal length;

a third parabolic mirror having a third mirror surface, wherein the third mirror surface is arranged to focus at a third focal length, the third mirror surface faces away from the second mirror surface, the third parabolic mirror has a through hole, the convergent light beam passes through the through hole, the second focal length exceeds the third mirror surface and is focused to a sample detecting position, the third parabolic mirror is located between the sample detecting position and the second parabolic mirror, the third mirror surface collects a Raman scattering light reflected by the sample and reflects it as a collimated light beam; and a fourth parabolic mirror having a fourth mirror surface, wherein the fourth mirror surface is arranged to focus at a fourth focal length, the fourth mirror surface collects the collimated light beam and condenses to an output light beam, the output light beam is focused at a focal point of the fourth focal length.

2. The multiple-wavelength reflective Raman probe of claim 1, further comprising:

a light beam receiver located at the focal point of the first focal length, used to fix a light source of the laser beam and to let the laser beam pass through and direct toward the first parabolic mirror.

3. The multiple-wavelength reflective Raman probe of claim 1, wherein a first focal length is 25.4 millimeters, a second focal length is 50.8 millimeters, a third focal length is 25.4 millimeters, and a fourth focal length is 101.8 millimeters.

4. The multiple-wavelength reflective Raman probe of claim 1, further comprising:

a first optical filter arranged between the first parabolic mirror and the second parabolic mirror, used to clean up laser line wavelength and suppress ambient light.

5. The multiple-wavelength reflective Raman probe of claim 1, wherein a diameter of the through hole is between 3 millimeters to 7 millimeters.

6. The multiple-wavelength reflective Raman probe of claim 1, further comprising:

a third fixing cage, wherein the third parabolic mirror is fixed in the third fixing cage, and the sample detecting position is adjacent to a bottom of the third fixing cage.

7. The multiple-wavelength reflective Raman probe of claim 1, further comprising:

a second optical filter located between the third parabolic mirror and the fourth parabolic mirror, used to intercept light in a specific wavelength range.

8. The multiple-wavelength reflective Raman probe of claim 1, further comprising:

a light beam outputter fixed at the focal point of the fourth focal length, used to connect a spectrometer.

9. The multiple-wavelength reflective Raman probe of claim 1, wherein a numerical aperture of the third parabolic mirror is greater than a numerical aperture of the fourth parabolic mirror, a numerical aperture of the fourth parabolic mirror is greater than a numerical aperture of the first parabolic mirror.

10. A Raman spectra detection device, comprising:

a laser source to provide a laser light beam, wherein the laser light beam can be configured to have different wavelengths;

a multiple-wavelength reflective Raman probe, comprising:

a first parabolic mirror having a first mirror surface, wherein the first mirror surface is arranged to focus at a first focal length, the first parabolic mirror receives the laser light beam, the laser light beam is reflected into a collimated light beam by the first mirror surface;

a second parabolic mirror having a second mirror surface, wherein the second mirror surface is arranged to focus at a second focal length, the second mirror surface faces toward the first mirror surface to receive the collimated light beam, the second mirror surface condenses the collimated light beam and reflects out a convergent light beam, the convergent light beam is focused at a focal point of the second focal length;

a third parabolic mirror having a third mirror surface, wherein the third mirror surface is arranged to focus at a third focal length, the third mirror surface faces away from the second mirror surface, the third parabolic mirror has a through hole, the convergent light beam passes through the through hole, the second focal length exceeds the third mirror surface and is focused on a sample detecting position, the third parabolic mirror is located between the sample detecting position and the second parabolic mirror, and the third mirror surface collects a Raman scattering light reflected by the sample detecting position and reflects as a collimated detection light beam; and a fourth parabolic mirror having a fourth mirror surface, wherein the fourth mirror surface is arranged to focus at a fourth focal length, the fourth mirror surface collects the detection light beam and condenses to an output light beam, the output light beam is focused at a focal point of the fourth focal length; and a spectrometer receiving the output light beam.

11. The Raman spectra detection device of claim 10, further comprising:

a light beam receiver located at the focal point of the first focal length, used to fix the laser source of the laser light beam and to let the laser light beam pass through and direct toward the first parabolic mirror; and a light beam outputter fixed at the focal point of the fourth focal length, used to connect the spectrometer;

wherein the output light beam is focused at the light beam outputter to enter an output optical fiber of the spectrometer.

12. The Raman spectra detection device of claim 11, wherein the output optical fiber is a round-to-linear optical fiber, the output optical fiber has an external connecting optical fiber portion and an internal connecting optical fiber portion, the external connecting optical fiber portion connects the light beam outputter, and the internal connecting optical fiber portion connects the spectrometer, an optical fiber bundle in the external connecting optical fiber portion is circular configuration, and an optical fiber bundle in the internal connecting optical fiber portion is linear configuration.

13. A Raman spectra detection device, comprising:

a multiple-wavelength reflective Raman probe, comprising:

a first parabolic mirror having a first mirror surface, wherein the first mirror surface is arranged to focus at a first focal length, the first parabolic mirror receives a laser light beam, the laser light beam is reflected into a collimated light beam by the first mirror surface;

a second parabolic mirror having a second mirror surface, wherein the second mirror surface is arranged to focus at a second focal length, the second mirror surface faces toward the first mirror surface to receive the collimated light beam, the second mirror surface condenses the collimated light beam and reflects out a convergent light beam, the convergent light beam is focused at a focal point of the second focal length;

a third parabolic mirror having a third mirror surface, wherein the third mirror surface is arranged to focus at a third focal length, the third mirror surface faces away from the second mirror surface, the third parabolic mirror has a through hole, the convergent light beam passes through the through hole, the second focal length exceeds the third mirror surface and is focused on a sample detecting position, the third parabolic mirror is located between the sample detecting position and the second parabolic mirror, the third mirror surface collects a Raman scattering light reflected by the sample detecting position, and reflects as a collimated detection light beam; and a fourth parabolic mirror having a fourth mirror surface, wherein the fourth mirror surface is arranged to focus at a fourth focal length, the fourth mirror surface collects the detection light beam and condenses to an output light beam, the output light beam is focused at a focal point of the fourth focal length;

a light beam receiver located at the focal point of the first focal length, used to fix a laser source of the laser light beam and to let the laser light beam pass through and direct toward the first parabolic mirror; and a spectrometer receiving the output light beam.

14. The Raman spectra detection device of claim 13, further comprising:

a first optical filter arranged between the first parabolic mirror and the second parabolic mirror, used to filter out the Raman spectra from an input optical fiber and to suppress ambient light.

15. The Raman spectra detection device of claim 13, further comprising:

a second optical filter located between the third parabolic mirror and the fourth parabolic mirror, used to intercept light in a specific wavelength range.

* * * * *